United States Patent

Maeda et al.

[11] Patent Number: 5,858,897
[45] Date of Patent: Jan. 12, 1999

[54] GLASS COMPOSITION FOR A SUBSTRATE

[75] Inventors: Kei Maeda; Hitoshi Onoda; Yasumasa Nakao; Jeetendra Sehgal, all of Yokohama, Japan

[73] Assignee: Asahi Glass Company Ltd., Tokyo, Japan

[21] Appl. No.: 816,674

[22] Filed: Mar. 13, 1997

[30] Foreign Application Priority Data

Mar. 14, 1996 [JP] Japan .................................. 8-057955
Sep. 17, 1996 [JP] Japan .................................. 8-245156

[51] Int. Cl.$^6$ ................................................. C03C 3/087
[52] U.S. Cl. ................................................. 501/70; 501/72
[58] Field of Search .......................... 501/70, 72

[56] References Cited

U.S. PATENT DOCUMENTS

| | | |
|---|---|---|
| 4,015,966 | 4/1977 | Weaver . |
| 5,296,294 | 3/1994 | Suzuki, et al. . |
| 5,599,754 | 2/1997 | Maeda et al. . |
| 5,631,195 | 5/1997 | Yanagisawa et al. ............... 501/72 |
| 5,721,181 | 2/1998 | Sehgal et al. ......................... 501/72 |

FOREIGN PATENT DOCUMENTS

| | | |
|---|---|---|
| 48-32113 | 4/1973 | Japan . |
| 51-45110 | 4/1976 | Japan . |
| 3-040933 | 2/1991 | Japan . |
| 7-257937 | 10/1995 | Japan . |
| 8-290938 | 11/1996 | Japan . |
| 8-290939 | 11/1996 | Japan . |
| WO 96/11887 | 4/1996 | WIPO . |

OTHER PUBLICATIONS

Chemical Abstracts, vol. 83, No. 8, Aug. 25, 1975 and JP 49 048 449, Dec. 21, 1974.

Patent Abstracts of Japan, vol. 015, No. 177, (C–0829), May 7, 1991, JP 03 040933, Feb. 21, 1991.

Patent Abstracts of Japan, vol. 096, No. 002, Feb 29, 1996, JP 07 257937, Oct. 9, 1995.

*Primary Examiner*—Karl Group
*Attorney, Agent, or Firm*—Oblon, Spivak, McClelland, Maier & Neustadt, P.C.

[57] ABSTRACT

A glass composition for a substrate consisting essentially of from 59 to 72 wt % of $SiO_2$, from 1 to 15 wt % of $Al_2O_3$, from 0.5 to 9 wt % of MgO, from 0.5 to 11 wt % of CaO, from 0 to 6 wt % of SrO, from 0 to 5 wt % of BaO, from 4 to 19 wt % of MgO+CaO+SrO+BaO, from 0 to 9 wt % of $Na_2O$, from 4 to 21 wt % of $K_2O$, from 10 to 22 wt % of $Na_2O+K_2O$, and from 0.5 to 10.5 wt % of $ZrO_2$, wherein the difference between the $SiO_2$ content and the $Al_2O_3$ content is from 50 to 71 wt %, and the specific gravity of the composition is less than 2.6.

12 Claims, No Drawings

GLASS COMPOSITION FOR A SUBSTRATE

BACKGROUND OF THE INVENTION

1. FIELD OF THE INVENTION

The present invention relates to a glass composition for a substrate which is useful for a flat display panel, particularly for a plasma display panel (PDP).

DISCUSSION OF BACKGROUND

PDP is prepared usually by baking metal electrodes, an insulating paste, a rib paste, etc. on a substrate glass at a maximum temperature of from about 550° to 600° C., followed by frit-sealing a facing plate. As a substrate glass for this purpose, it has heretofore been common to employ soda lime silicate glass which is widely used in the field of buildings or automobiles.

However, the glass transition temperature of such soda lime silicate glass is at a level of from 530° to 560° C. Therefore, if subjected to heat treatment at the above maximum temperature, the substrate glass undergoes deformation or shrinkage, and thus undergoes a substantial dimensional change, whereby it has been difficult to precisely align the electrode positions with the facing plate. Especially when a continuous baking furnace such as a belt furnace having a high productivity is used for the production of PDP, there has been a problem that a temperature difference will result between the front end and the rear end of the glass plate during baking, and the glass plate will undergo an asymmetrical dimensional change between the forward and rear ends.

To solve such a heat deformation or heat shrinkage problem of a glass substrate, a glass which has a thermal expansion coefficient close to soda lime silicate glass and which has a high glass transition temperature and a high strain point, has been proposed (JP-A-3-40933, JP-A-7-257937). If such a glass is employed, even when a continuous baking furnace is used for heat treatment for the production of PDP, the panel can be baked at high precision, since it scarcely undergoes an asymmetrical dimensional change between the front and rear ends as will be problematic with soda lime silicate glass.

However, due to a trend for large size PDP in recent years, handling of the substrate during the production process tends to be increasingly difficult. Especially, a large size substrate receives a larger bending stress by its own weight in many cases, whereby presence of a slight scar is likely to bring about breakage during the production process.

Further, the compositions which have been proposed, have an additional problem that they have large specific gravities, whereby it is difficult to accomplish weight reduction of materials.

Furthermore, as high resolution of a display image is required for PDP, the maximum allowance for the dimensional change of a glass substrate tends to be increasingly strict, and a glass having a high glass transition temperature, is required.

SUMMARY OF THE INVENTION

It is an object of the present invention to solve the above problems and to provide a glass composition for a substrate, which has a high glass transition temperature and a thermal expansion coefficient equivalent to soda lime silicate glass and which is scratch resistant and scarcely breakable during the production process.

The present invention provides a glass composition for a substrate consisting essentially of from 59 to 72 wt % of $SiO_2$, from 1 to 15 wt % of $Al_2O_3$, from 0.5 to 9 wt % of MgO, from 0.5 to 11 wt % of CaO, from 0 to 6 wt % of SrO, from 0 to 5 wt % of BaO, from 4 to 19 wt % of MgO+CaO+SrO+BaO, from 0 to 9 wt % of $Na_2O$, from 4 to 21 wt % of $K_2O$, from 10 to 22 wt % of $Na_2O+K_2O$, and from 0.5 to 10.5 wt % of $ZrO_2$, wherein the difference between the $SiO_2$ content and the $Al_2O_3$ content is from 50 to 71 wt %, and the specific gravity of the composition is less than 2.6.

DETAILED DESCRIPTION OF THE PREFERRED EMBODIMENTS

Now, the composition of the glass of the present invention will be described.

$SiO_2$ is a component constituting the network of the glass. If its content is less than 59 wt %, the heat resistance of the glass tends to be poor, and the glass tends to be scratchable. It is preferably at least 63 wt %. On the other hand, if it exceeds 72 wt %, the thermal expansion coefficient tends to be too small. It is preferably at most 70 wt %.

$Al_2O_3$ is incorporated in an amount of at least 1 wt % to increase the glass transition temperature and improve the heat resistance. From this viewpoint, its content is preferably at least 2 wt %. On the other hand, if its content exceeds 15 wt %, the meltability of the glass tends to be poor. Its content is preferably at most 12 wt %, more preferably at most 9 wt %.

MgO is incorporated in an amount of at least 0.5 wt % to lower the viscosity during melting of the glass and facilitate the melting. Its content is preferably at least 2 wt %. On the other hand, if its content exceeds 9 wt %, the thermal expansion coefficient tends to be too large, and the glass tends to be scratchable. From this viewpoint, its content is preferably at most 7 wt %.

CaO is incorporated in an amount of at least 0.5 wt % to reduce the viscosity during melting and facilitate the melting. Its content is preferably at least 2 wt %. On the other hand, if its content exceeds 11 wt %, the thermal expansion coefficient tends to be too large, and the glass tends to be scratchable. Further, the devitrification temperature tends to be high and tends to exceed the forming temperature by a float process (for example, the temperature for a viscosity of $10^4$ poise), whereby forming by a float process tends to be difficult. From this viewpoint, its content is preferably at most 9 wt %.

SrO is not an essential component, but may be incorporated as it is effective to lower the viscosity during melting of the glass and thus facilitate the melting. However, if its content exceeds 6 wt %, the glass tends to be scratchable. Preferably, its content is at most 4 wt %, more preferably at most 2 wt %.

BaO is not an essential component, but may be added as it is effective to lower the viscosity during melting of the glass and thus facilitate the melting. However, if its content exceeds 5 wt %, the glass tends to be scratchable. Preferably, its content is 2 wt %.

The content of SrO and BaO is preferably at most 4 wt %, more preferably at most 3 wt %, in their total amount, to prevent that the glass tends to be too scratchable.

The content of MgO, CaO, SrO and BaO is at least 4 wt % in their total amount to lower the viscosity during melting of the glass and thereby facilitate the melting. To further facilitate the melting, the total amount is preferably at least 6 wt %, more preferably at least 8 wt %, most preferably at least 10 wt %. On the other hand, if the total amount exceeds 19 wt %, the glass tends to be scratchable, and the devitrification temperature tends to be high. From this viewpoint, the total amount is preferably at most 17 wt %, more preferably at most 16 wt %.

Na$_2$O is not essential, but may be incorporated, since it is effective to lower the viscosity during melting of the glass and thereby facilitate the melting. For this purpose, its content is preferably at least 1 wt %. On the other hand, if its content exceeds 9 wt %, the thermal expansion coefficient tends to be too large, and the chemical durability or the glass transition temperature tends to be low, and the electrical resistance tends to be small. From this viewpoint, its content is at most 7 wt %, more preferably at most 4 wt %.

K$_2$O serves to lower the viscosity during melting of the glass and thus facilitate the melting, and it is a component which does not bring about deterioration of the chemical durability or lowering of the glass transition temperature so much as Na$_2$O. Therefore, it is incorporated in an amount of at least 4 wt %, preferably at least 9 wt %, more preferably at least 10 wt %, most preferably at least 11 wt %. On the other hand, if its content exceeds 21 wt %, the thermal expansion coefficient tends to be too large, and the chemical durability tends to be low. From this viewpoint, its content is preferably at most 16 wt %.

The content of Na$_2$O and K$_2$O is at least 10 wt % in their total amount to lower the viscosity during melting of the glass and facilitate the melting. Their total amount is preferably at least 12 wt %. On the other hand, if the total amount exceeds 22 wt %, the chemical durability tends to be low, and the electrical resistance tends to be small. From this viewpoint, the total amount is at most 17 wt %.

ZrO$_2$ serves to increase the glass transition temperature and improve the chemical durability of the glass. For this purpose, it is incorporated in an amount at least 0.5 wt %, preferably at least 2 wt %. On the other hand, if its content exceeds 10.5 wt %, the glass tends to be scratchable. From this viewpoint, its content is preferably at most 5 wt %.

In the present invention, the difference between the SiO$_2$ content and the Al$_2$O$_3$ content is adjusted to be from 50 to 71 wt % to obtain a glass which has a high glass transition temperature and which is scarcely scratchable. The above difference is preferably at least 51 wt %. On the other hand, in order to facilitate the melting, the above difference is preferably at most 70 wt %.

In addition to the above components, the glass of the present invention may contain As$_2$O$_3$, Sb$_2$O$_3$, P$_2$O$_5$, F and Cl in a total amount of at most 2 wt % to improve the meltability, the clarity and the forming property of the glass.

To facilitate recycling of glass, the content of As$_2$O$_3$ or Sb$_2$O$_3$ should be preferably be no more than 0.5 wt %, more preferably no more than an impurity level. Likewise, to maintain the strain point at a high level, the content of P$_2$O$_5$, F or Cl should be preferably be no more than 0.5 wt %, more preferably no more than an impurity level.

Further, in order to improve the chemical durability of the glass, La$_2$O$_3$, TiO$_2$ and SnO$_2$ may be incorporated in a total amount of at most 5 wt %. Further, coloring agents such as Fe$_2$O$_3$, CoO, NiO, Se and Nd$_2$O$_3$ may be incorporated to adjust the color of the glass. The content of such coloring agents is preferably at most 1 wt % in their total amount.

Further, in order to improve the meltability, B$_2$O$_3$ may be incorporated. However, its excessive incorporation decreases the thermal expansion coefficient. Accordingly, its content is preferably less than 1.5 wt %. In some cases, it is better not to substantially incorporate it, in order to make sure that no adverse effect will be given to forming by a float process.

ZnO may be incorporated in order to improve the meltability. However, if it is incorporated in an amount of 5 wt % or more, it is likely to be reduced in the float bath and thus is likely to bring about a drawback.

Further, Li$_2$O may be incorporated in order to improve the meltability. However, if it is incorporated in an amount of 3 wt % or more, the glass transition temperature tends to be low.

The specific gravity of the glass of the present invention thus obtained, is less than 2.6, preferably at most 2.55. The glass transition temperature is preferably at least 600° C., more preferably at least 660° C. The average thermal expansion coefficient within a range of from 50° to 350° C. is preferably within a range of from $75 \times 10^{-7}$ to $95 \times 10^{-7}$/°C., more preferably within a range of from $80 \times 10^{-7}$ to $90 \times 10^{-7}$/°C.

To bring the glass transition temperature to a level of at least 660° C., the following composition is, for example, preferred. The composition consists essentially of from 59 to 72 wt % of SiO$_2$, from 2 to 9 wt % of Al$_2$O$_3$, from 0.5 to 9 wt % of MgO, from 0.5 to 11 wt % of CaO, from 0 to 4 wt % of SrO, from 0 to 2 wt % of BaO, from 0 to 4 wt % of SrO+BaO, from 8 to 17 wt % of MgO+CaO+SrO+BaO, from 0 to 7 wt % of Na$_2$O, from 9 to 21 wt % of K$_2$O, from 10 to 22 wt % of Na$_2$O+K$_2$O, and from 2 to 5 wt % of ZrO$_2$.

The glass of the present invention preferably has a brittleness index of at most 7400 m$^{-\frac{1}{2}}$, more preferably at most 7300 m$^{-\frac{1}{2}}$.

In the present invention, as the brittleness index of glass, brittleness index B proposed by Lawn et al. is used (B. R. Lawn and D. B. Marshall, J. Am. Ceram. Soc., 62[7–8] 347–350(1979)). Here, brittleness index B is defined by the formula (1) using the Vickers hardness H$_v$ and the fracture toughness K$_c$ of the material.

$$B = H_v/K_c \quad (1)$$

The glass obtained by the present invention is suitable for use as a substrate for PDP. Its spectral transmittance is preferably at least 85% within the ranges of from 425 to 475 nm, from 510 to 560 nm and from 600 to 650 nm, respectively, since light generation within these wavelength ranges can effectively be used for display.

The glass substrate of the present invention can be prepared, for example, by the following method. Namely, raw materials of the respective components which are commonly used, are blended to obtain a desired composition, which is continuously introduced into a melting furnace, and heated and melted at a temperature of from 1500° to 1600° C. This molten glass is formed into a sheet having a predetermined thickness by a float process, and the sheet is annealed and then cut to obtain a transparent glass substrate.

The glass composition of the present invention is basically suitable for forming by a float process. Namely, the devitrification temperature is lower than the forming temperature by a float process (in the present invention, the temperature at which the viscosity becomes 10$^4$ poise), whereby there will be no trouble such as devitrification during forming by a float process.

Now, the present invention will be described in further detail with reference to Examples. However, it should be understood that the present invention is by no means restricted by such specific Examples.

EXAMPLES 1 to 20 and COMPARATIVE EXAMPLES 21 to 26.

Test Examples relating to the present invention are shown in Tables 1 to 4. Example Nos. 1 to 20 represent working Examples of the present invention, and Example Nos. 21 to 26 represent Comparative Examples.

Raw materials for the respective components were mixed to have the desired composition and heated and melted at a temperature of from 1550° to 1650° C. for from 4 to 5 hours by means of a platinum crucible. During the melting, a platinum stirrer was used for stirring for two hours to homogenize the glass.

With respect to the glass thus obtained, the brittleness index, the thermal expansion coefficient, the glass transition temperature and the specific gravity were measured by the following methods and shown in Tables 1 to 4 together with the glass compositions. Further, with respect to some of them, the strain point, $T(\log\eta=2)$ i.e. the temperature at which the viscosity becomes $10^2$ poise as an index for the meltability, $T(\log\eta=4)$ i.e. the temperature at which the viscosity becomes $10^4$ poise as an index for a float forming property and $T_{liq}$ i.e. the devitrification temperature, were also shown by the unit °C.

Specific gravity

Using a glass block of about 20 g containing no bubble, the specific gravity was measured by an Archimedes method.

Brittleness index (unit: $m^{-\frac{1}{2}}$)

A problem when the brittleness index is applied to glass, is that it is difficult to accurately evaluate the fracture toughness $K_c$. However, the present applicants have studied several methods and as a result, have found that the brittleness can quantitatively evaluated from the relation between the size of the mark of an indenter left on the glass surface when the Vickers indenter was pressed against the glass surface and the length of cracks formed from the four corners of the mark. This relation can be defined by the following formula (2). Here, P is the pressing load of the Vickers indenter, and a and c are the diagonal length of the Vickers indentation mark and the length of cracks formed from the four corners of the mark (the total length of symmetrical two cracks containing the mark of the indenter). Using the formula (2) and the sizes of Vickers indentation marks formed on various glass surfaces, the brittleness index was evaluated.

$$c/a = 0.0056 B^{2/3} P^{1/6} \qquad (2)$$

Average thermal expansion coefficient (unit: $\times 10^{-7}/$°C.)

By means of a differential thermal expansion meter and using a quartz glass as a reference sample, elongation of a glass was measured when it was heated from room temperature at a rate of 5° C./min. The measurement was continued to a temperature (yield point) at which elongation was no longer observed even when the glass was softened, and the average linear thermal expansion coefficient within a range of from 50° to 350° C. was calculated.

Glass transition temperature (unit: °C.)

The bending point in the thermal expansion curve was taken as the glass transition temperature.

As is evident from the Tables, the brittleness indices of the glass compositions of the present invention are not higher than 7400 $m^{-\frac{1}{2}}$, thus indicating that the glasses are scarcely scratchable. The thermal expansion coefficients are within a range of from $75\times10^{-7}$ to $95\times10^{-7}$/°C., which is equal to the thermal expansion coefficient of soda lime glass which has been used as a substrate for PDP, and therefore the same type of frit material can be used. Further, the glass transition temperatures are all at least 600° C., thus indicating that there is no such problem that the glasses undergo deformation or shrinkage during the preparation of large size PDP. The specific gravity is less than 2.6, which facilitates weight reduction of the materials.

On the other hand, Example 21 has a glass transition temperature of 550° C., whereby thermal deformation of the glass during the preparation of PDP will be problematic. In Examples 22 to 26, the brittleness indices exceed 7400 $m^{-\frac{1}{2}}$, thus indicating that the glasses are susceptible to scratching, and the probability of breakage during the production process is high. Further, the compositions of Examples 22 to 26 have specific gravities of at least 2.6, whereby it is difficult to reduce the weight of the materials.

TABLE 1

|  | 1 | 2 | 3 | 4 | 5 | 6 | 7 |
|---|---|---|---|---|---|---|---|
| $SiO_2$ | 59.9 | 63.0 | 62.2 | 68.8 | 60.9 | 64.1 | 68.4 |
| $Al_2O_3$ | 8.0 | 3.8 | 9.6 | 2.5 | 9.2 | 11.2 | 2.8 |
| MgO | 3.2 | 4.3 | 4.6 | 5.8 | 2.4 | 3.8 | 4.5 |
| CaO | 6.7 | 9.2 | 6.4 | 9.0 | 3.4 | 5.3 | 6.3 |
| SrO | 3.7 | 0.0 | 2.8 | 0.4 | 3.1 | 0.0 | 0.0 |
| BaO | 0.0 | 0.0 | 0.0 | 1.3 | 0.0 | 2.4 | 3.1 |
| $Na_2O$ | 2.3 | 1.0 | 5.3 | 4.3 | 6.5 | 8.2 | 4.9 |
| $K_2O$ | 13.2 | 15.3 | 7.4 | 6.6 | 9.9 | 4.1 | 7.9 |
| $ZrO_2$ | 3.0 | 3.4 | 1.7 | 1.3 | 4.4 | 1.0 | 2.1 |
| $SiO_2$—$Al_2O_3$ | 51.9 | 59.2 | 52.6 | 66.3 | 51.7 | 52.9 | 65.6 |
| SrO + BaO | 3.7 | 0.0 | 2.8 | 1.7 | 3.1 | 2.4 | 3.1 |
| MgO + CaO + SrO + BaO | 13.6 | 13.5 | 13.8 | 16.5 | 8.9 | 11.5 | 13.9 |
| Brittleness index | 7400 | 7200 | 7200 | 7200 | 7300 | 7200 | 7200 |
| Glass transition temperature | 669 | 682 | 648 | 634 | 667 | 652 | 646 |
| Strain point | 610 |  |  |  |  |  | 580 |
| Average thermal expansion coefficient | 85 | 84 | 80 | 75 | 85 | 81 | 80 |
| Specific gravity | 2.58 | 2.55 | 2.55 | 2.53 | 2.57 | 2.53 | 2.53 |
| $T(\log \eta = 2)$ | 1594 |  |  | 1559 |  |  | 1608 |
| $T(\log \eta = 4)$ | 1171 |  |  | 1120 |  |  | 1156 |
| $T_{liq}$ | 1120 |  |  |  |  |  | 1120 |

TABLE 2

|  | 8 | 9 | 10 | 11 | 12 | 13 | 14 |
|---|---|---|---|---|---|---|---|
| $SiO_2$ | 62.8 | 63.1 | 60.6 | 61.7 | 71.3 | 64.6 | 60.6 |
| $Al_2O_3$ | 7.9 | 7.3 | 7.1 | 9.4 | 1.3 | 2.4 | 3.5 |
| MgO | 0.6 | 8.7 | 4.5 | 3.6 | 4.4 | 3.7 | 4.5 |
| CaO | 10.4 | 0.9 | 6.3 | 4.9 | 9.3 | 6.0 | 3.4 |
| SrO | 1.6 | 3.3 | 1.6 | 1.6 | 0.0 | 0.0 | 1.0 |
| BaO | 0.0 | 0.0 | 0.0 | 1.2 | 0.0 | 0.0 | 0.0 |
| $Na_2O$ | 5.5 | 5.7 | 2.9 | 5.7 | 8.3 | 0.5 | 0.0 |
| $K_2O$ | 8.4 | 9.0 | 13.0 | 9.0 | 4.7 | 18.1 | 20.5 |
| $ZrO_2$ | 2.9 | 2.1 | 4.1 | 2.9 | 0.7 | 4.7 | 6.5 |
| $SiO_2$—$Al_2O_3$ | 54.9 | 55.8 | 53.5 | 52.3 | 70.0 | 62.2 | 57.1 |
| SrO + BaO | 1.6 | 3.3 | 1.6 | 2.8 | 0.0 | 0.0 | 1.0 |
| MgO + CaO + SrO + BaO | 12.6 | 12.9 | 12.4 | 11.3 | 13.7 | 9.7 | 8.9 |
| Brittleness index | 7200 | 7300 | 7400 | 7300 | 7100 | 7200 | 7300 |
| Glass transition temperature | 657 | 642 | 682 | 665 | 612 | 672 | 672 |
| Strain point |  |  |  |  |  | 620 |  |
| Average thermal expansion coefficient | 83 | 82 | 83 | 83 | 86 | 84 | 91 |
| Specific gravity | 2.56 | 2.53 | 2.58 | 2.55 | 2.47 | 2.52 | 2.55 |
| $T(\log \eta = 2)$ |  |  | 1580 |  |  | 1629 | 1620 |
| $T(\log \eta = 4)$ |  |  | 1165 |  |  | 1205 | 1214 |
| $T_{liq}$ |  |  | 1100 |  |  | 1130 |  |

TABLE 3

|  | 15 | 16 | 17 | 18 | 19 | 20 |
|---|---|---|---|---|---|---|
| $SiO_2$ | 59.3 | 65.2 | 64.8 | 63.4 | 63.6 | 63.7 |
| $Al_2O_3$ | 3.5 | 4.0 | 4.0 | 3.9 | 4.0 | 1.8 |
| MgO | 4.5 | 4.4 | 4.4 | 4.0 | 3.5 | 3.8 |
| CaO | 3.4 | 7.0 | 7.0 | 4.5 | 4.5 | 4.5 |
| SrO | 1.0 | 0.0 | 0.0 | 5.5 | 6.0 | 0.0 |
| BaO | 0.0 | 0.0 | 0.0 | 4.0 | 0.0 | 0.0 |
| $Na_2O$ | 0.0 | 2.0 | 1.0 | 0.0 | 0.5 | 0.0 |
| $K_2O$ | 20.5 | 14.0 | 15.4 | 14.0 | 15.9 | 16.0 |
| $ZrO_2$ | 6.5 | 3.4 | 3.4 | 0.7 | 2.0 | 10.2 |
| $B_2O_3$ | 1.3 | 0.0 | 0.0 | 0.0 | 0.0 | 0.0 |
| $SiO_2$—$Al_2O_3$ | 55.8 | 61.2 | 60.8 | 59.5 | 59.6 | 61.9 |
| SrO + BaO | 1.0 | 0.0 | 0.0 | 9.5 | 6.0 | 0.0 |
| MgO + CaO + SrO + BaO | 8.9 | 11.4 | 11.4 | 18.0 | 14.0 | 8.3 |
| Brittleness index | 7300 | 7200 | 7100 | 7300 | 7300 | 7350 |
| Glass transition temperature | 672 | 657 | 663 | 631 | 642 | 672 |
| Strain point |  | 598 | 610 |  |  |  |
| Average thermal expansion coefficient | 91 | 83 | 84 | 87 | 88 | 84 |
| Specific gravity | 2.55 | 2.52 | 2.51 | 2.59 | 2.55 | 2.58 |
| $T(\log \eta = 2)$ | 1580 | 1590 | 1608 |  |  |  |
| $T(\log \eta = 4)$ | 1170 | 1192 | 1205 |  |  |  |
| $T_{liq}$ |  | 1140 | 1130 |  |  |  |

TABLE 4

|  | 21 | 22 | 23 | 24 | 25 | 26 |
|---|---|---|---|---|---|---|
| $SiO_2$ | 72.5 | 58.0 | 57.4 | 57.4 | 58.6 | 58.0 |
| $Al_2O_3$ | 1.0 | 10.0 | 12.1 | 12.1 | 14.2 | 12.5 |
| MgO | 2.5 | 4.0 | 3.0 | 3.0 | 2.0 | 2.0 |
| CaO | 9.0 | 9.0 | 5.9 | 7.9 | 5.1 | 5.0 |
| SrO | 0.0 | 3.8 | 1.0 | 1.0 | 2.0 | 2.0 |
| BaO | 0.0 | 3.0 | 4.0 | 4.0 | 3.0 | 6.0 |
| ZnO | 0.0 | 0.0 | 2.0 | 0.0 | 0.0 | 0.0 |
| $Na_2O$ | 14.0 | 4.0 | 4.2 | 4.2 | 6.0 | 4.0 |
| $K_2O$ | 1.0 | 6.0 | 8.2 | 8.2 | 6.1 | 8.0 |
| $ZrO_2$ | 0.0 | 2.0 | 2.2 | 2.2 | 3.0 | 2.5 |
| SO3 | 0.0 | 0.2 | 0.0 | 0.0 | 0.0 | 0.0 |
| $SiO_2$—$Al_2O_3$ | 71.5 | 48.0 | 45.3 | 45.3 | 44.4 | 45.5 |
| SrO + BaO | 0.0 | 6.8 | 5.0 | 5.0 | 5.0 | 8.0 |
| MgO + CaO + SrO + BaO | 11.5 | 19.8 | 13.9 | 15.9 | 12.1 | 15.0 |
| Brittleness index | 7100 | 7600 | 7600 | 7500 | 7500 | 7600 |

TABLE 4-continued

|  | 21 | 22 | 23 | 24 | 25 | 26 |
|---|---|---|---|---|---|---|
| Glass transition temperature | 550 | 645 | 655 | 646 | 654 | 652 |
| Average thermal expansion coefficient | 87 | 79 | 81 | 84 | 81 | 81 |
| Specific gravity | 2.49 | 2.65 | 2.63 | 2.62 | 2.60 | 2.63 |

As described in the foregoing, the glass of the present invention is scarcely scratchable and has high heat resistance and a thermal expansion coefficient equal to soda lime silicate glass, and thus it is useful for an application where such properties are required, for example, as a substrate for PDP. Further, it has a small specific gravity, which facilitates weight reduction of the materials.

What is claimed is:

1. A glass composition for a substrate consisting essentially of from 59 to 72 wt % of $SiO_2$, from 1 to 15 wt % of $Al_2O_3$, from 0.5 to 9 wt % of MgO, from 0.5 to 11 wt % of CaO, from 0 to 6 wt % of SrO, from 0 to at most 0.4 wt % of BaO, from 4 to 19 wt % of MgO+CaO+SrO+BaO, from 0 to 9 wt % of $Na_2O$, from 4 to 21 wt % of $K_2O$, from 10 to 22 wt % of $Na_2O+K_2O$, and from 0.5 to 10.5 wt % of $ZrO_2$, wherein the difference between the $SiO_2$ content and the $Al_2O_3$ content is from 50 to 71 wt %, and the specific gravity of the composition is less than 2.6.

2. The glass composition for a substrate according to claim 1, wherein the brittleness index is at most 7400 $m^{-1/2}$.

3. The glass composition for a substrate according to claim 1, wherein the glass transition temperature is at least 600° C.

4. The glass composition for a substrate according to claim 1, wherein the average thermal expansion coefficient within a temperature range of from 50 to 350° C. is from $75 \times 10^{-7}$ to $95 \times 10^{-7}$/°C.

5. The glass composition for a substrate according to claim 1, which consists essentially of from 59 to 72 wt % of $SiO_2$, from 2 to 9 wt % of $Al_2O_3$, from 0.5 to 9 wt % of MgO, from 0.5 to 11 wt % of CaO, from 0 to 4 wt % of SrO, from 0 to at most 0.4 wt % of BaO, from 0 to 4 wt % of SrO+BaO, from 8 to 17 wt % of MgO+CaO+SrO+BaO, from 0 to 7 wt % of $Na_2O$, from 9 to 21 wt % of $K_2O$, from 10 to 22 wt % of $Na_2O+K_2O$, and from 2 to 5 wt % of $ZrO_2$.

6. The glass composition for a substrate according to claim 5, wherein the glass transition temperature is at least 660° C.

7. A plasma display panel having a substrate which is made of the glass composition for a substrate as defined in claim 1.

8. A plasma display panel having a substrate which is made of the glass composition for a substrate as defined in claim 5.

9. The glass composition according to claim 1, which contains 0 to 0.3 wt % of BaO.

10. The glass composition according to claim 1, which contains 0 to 0.2 wt % of BaO.

11. The glass composition according to claim 1, which contains 0 to 0.1 wt % of BaO.

12. The glass composition according to claim 1, which contains 0 wt % of BaO.

* * * * *